United States Patent [19]

Hayashi et al.

[11] Patent Number: 4,757,403
[45] Date of Patent: Jul. 12, 1988

[54] PINCH ROLLER COMPRESSIVE MECHANISM

[75] Inventors: Hideki Hayashi; Hideyo Ishikawa, both of Tokyo, Japan

[73] Assignee: Clarion Co., Ltd., Tokyo, Japan

[21] Appl. No.: 909,666

[22] Filed: Sep. 19, 1986

[30] Foreign Application Priority Data

Sep. 27, 1985 [JP] Japan .................................. 60-212626

[51] Int. Cl.⁴ .............................................. G11B 21/16
[52] U.S. Cl. ..................................................... 360/105
[58] Field of Search ............................. 360/105, 96.2; 242/197-200

[56] References Cited

U.S. PATENT DOCUMENTS 4,511,939  4/1985  Shinohara ........................... 360/105

Primary Examiner—A. J. Heinz
Attorney, Agent, or Firm—Flynn, Thiel, Boutell & Tanis

[57] ABSTRACT

A pinch roller compressive mechanism of a tape player includes a head plate movable on a chassis and having a pivotably mounted sub-plate which includes engage portions. One end of each biasing spring for biasing a pinch roller to a capstan shaft engages the engage portion of the sub-plate, so that its counterforce is accepted by the engage portion and never applied to the head plate.

5 Claims, 2 Drawing Sheets

PINCH ROLLER COMPRESSIVE MECHANISM

FIELD OF THE INVENTION

This invention relates to a pinch roller compressive mechanism in a tape player, and more particularly to a mechanism in which a biasing means for close contact between pinch rollers and capstan shafts does not apply its counterforce to a head plate when the head plate takes its withdrawal position.

BACKGROUND OF THE INVENTION

In an auto-reversal tape player, a tape is selectively transported in a desired one of opposite directions by compressing a corresponding pinch roller to an associated capstan shaft. The compressive contact between the pinch roller and capstan shaft is established when a pivotably supported pinch roller support plate is biased to the capstan shaft by a compression spring. To change the tape travelling direction, a change plate is moved in a corresponding direction to rotate the support plate of one of the pinch rollers away from the associated capstan shaft against the energy of the spring and bring the support plate of the other pinch roller into contact with the other capstan shaft associated therewith.

In the prior art compressive mechanism, however, opposite ends of the compression spring are connected to the support plate and the head plate (carrying a head thereon), and the energy to move the head plate from its stop position to its play position (hereinafter often called "advance") must overcome the energy of the compression spring. Particularly in a most recent tape player in which a motor power is used to bring the head to its play position after a tape cassette is inserted in position, the use of a larger-scaled compression spring invites a significant resistance which must be overcome by a larger-scaled motor to move the head plate ahead because the resistance otherwise decelerates the advance movement of the head plate and largely prolongs the time for establishing the play mode of the tape player.

This problem also exists in a one-way driving tape player as well as in the auto-reversal type described above.

OBJECT OF THE INVENTION

It is therefore an object of the invention to provide a pinch roller compressive mechanism in which pinch roller compression springs never prevent a smooth movement of a head plate.

SUMMARY OF THE INVENTION

According to the invention, a pinch roller compressive mechanism includes a pivotable sub-plate which is pivotably supported on a head plate which is movable on a chassis of a tape player. The sub-plate engages respective ends of pinch roller biasing means (compression springs in a preferred embodiment) so that the counterforce of the biasing means is never directly applied to the head plate.

Due to the use of the sub-plate, a gap is produced between the sub-plate and the compression springs when the head plate is located at its withdrawal position, whereas the compression springs engage and rotate the sub-plate when the head plate takes its advance position. Therefore, any counterforce of the biasing means never stresses the sub-plate nor head plate before the head plate substantially completes its advance movement.

BRIEF DESCRIPTION OF THE DRAWINGS

FIGS. 1 and 2 are plan views of a pinch roller compressive mechanism embodying the invention, in which FIG. 1 shows a configuration where the head plate takes its withdrawal position, and FIG. 2 shows a configuration where the head plate takes its advance position.

DETAILED DESCRIPTION

Figure 1:
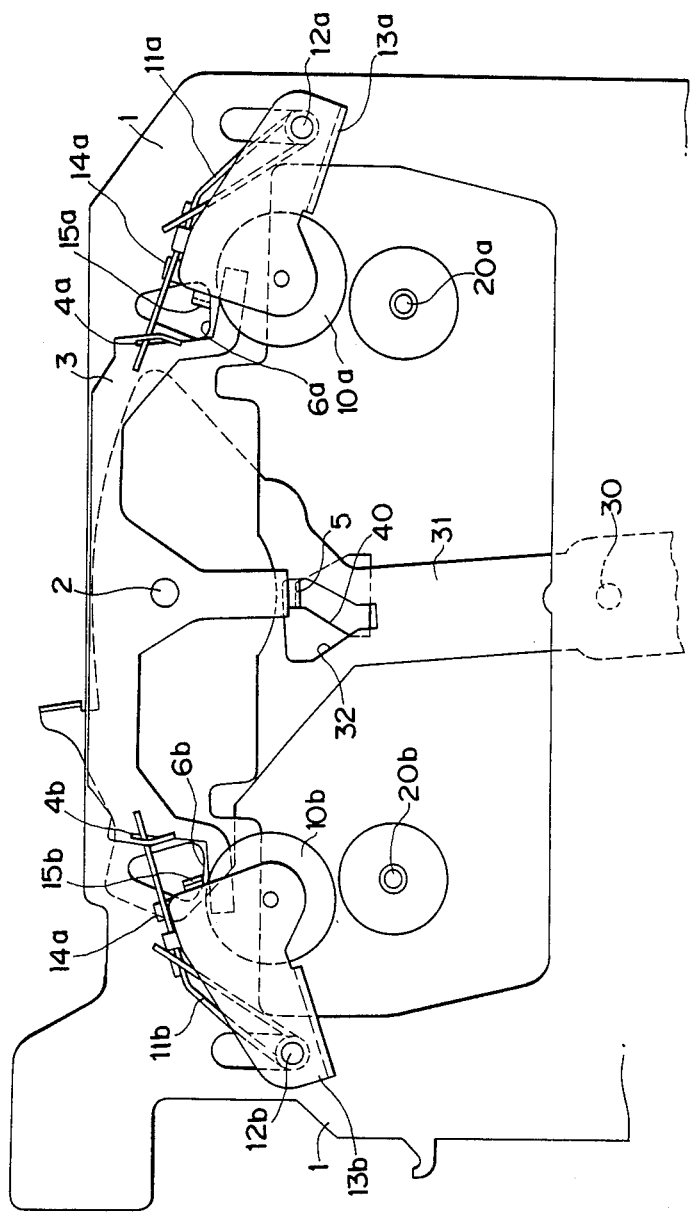
Figure 2:
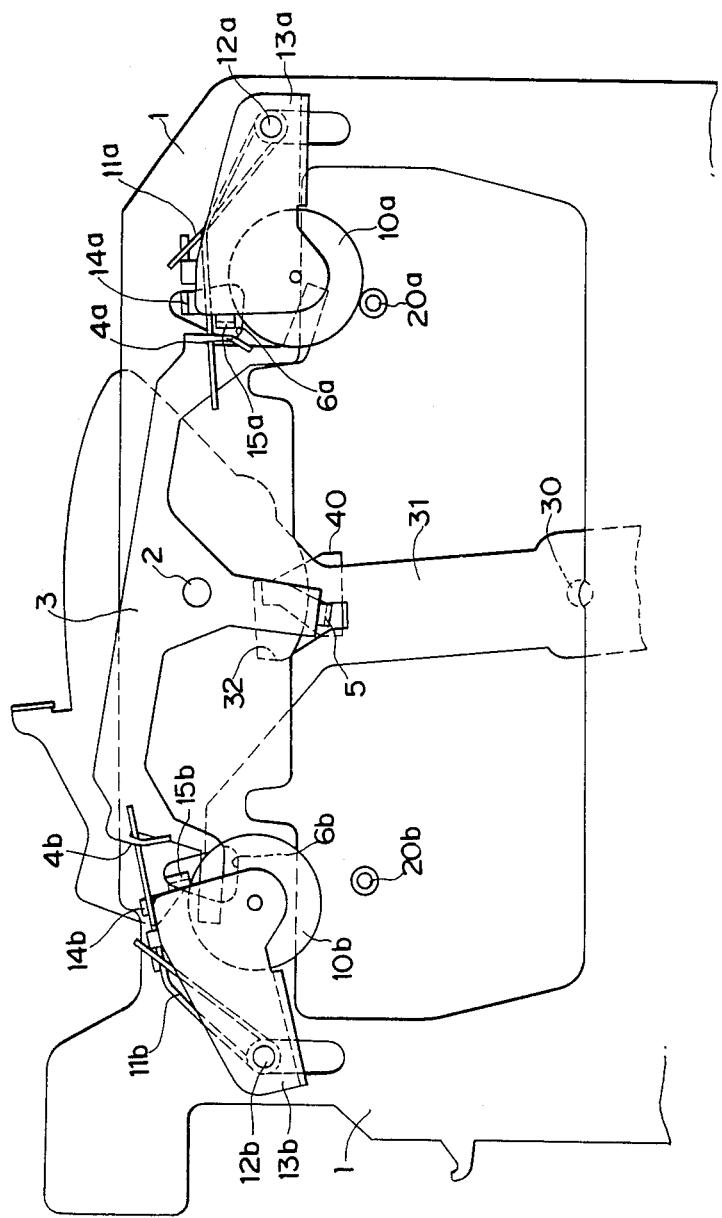

The inventions hereinbelow described in detail, referring to a preferred embodiment illustrated in the drawings. The illustrated mechanism is shown as applied to an auto-reversal type tape player.

A head plate 1 movable back and forth on a chassis of the tape player has a sub-plate 3 which is pivotably supported by an axle 2 at the center thereof. The sub-plate 3 has right and left extensions at both sides of the axle 2 which are provided with engage portions 4a and 4b to engage respective ends of compression springs 11a and 11b which are biasing means of right and left pinch rollers 10–10b (for opposite driving rotations). Each engage portion 4a(4b) is configured to loosely receive the compression spring 11a(11b) when the head plate 1 takes its withdrawal position but closely engage same when the head plate 1 takes its advance position. The sub-plate 3 may be provided at a central portion thereof with a projection 5 extending in the advance direction of the head plate 1.

The pinch rollers 10a–10b are opposed to capstan shafts 20a–20b rotatably supported on the chassis for opposite driving rotations. Each pinch roller 10a(10b) is rotatably supported on a support plate 13a(13b) which is pivotally mounted on the chassis by an axle 12a(12b). Each compression spring 11a(11b) is a torsion spring including a spiral closed end which engages the axle 12a(12b) coaxially with the support plate 13a(13b). One extension of the open end of the compression spring 11a(11b) passes along a block member 14a(14b) and terminates in the engage portion 4a(4b) of the sub-plate 3. Each support plate 13a(13b) has a projection 15a(15b) which engages a push portion 6a(6b) of the head plate 1 to move the pinch roller 10a(10b) away from the capstan shaft 20a(20b) when the head plate 1 takes its withdrawal position. A change plate 31 is supported on the chassis of the tape player pivotably in the right or left direction about an axle 30 upon a change in the tape travelling direction. Change plate 31 extends to a central portion of the sub-plate 3 and includes a cam 32 accepting therein the projection 5 of the sub-plate 3. The cam 32 may be a V-shaped hole bevelling toward the advance direction of the head plate 1 so that the angled right and left side margins can urge the projection 5 to pivot the sub-plate 3 to the right or left.

A cam 40 is provided on the chassis of the tape player. The cam 40 has an upset V-shaped configuration tapered oppositely of the cam 32 of the change plate 31. The cam 40 also receives therein the projection 5 of the sub-plate 3. The cam 40 permits the projection 5 to move right and left in a wide portion thereof when the sub-plate 3 takes its advance position, but closely immovably accepts same in the bevelled end thereof to maintain the sub-plate 3 in a central neutral position when the sub-plate 3 takes its withdrawal position.

The compressive mechanism operates as described hereinbelow.

(1) On withdrawal of Head Plate (Stop Mode)

In the dormant configuration of the tape player, the head plate 1 takes its withdrawal position, together with the sub-plate 3 thereon. Therefore, the projection 5 is located at the bevelled end of the cam 40 of the chassis so that the sub-plate 3 is held at its neutral angular position immovably to the right or left. Each pinch roller 10a(10b) is rotated toward the withdrawal direction because its projection 15a(15b) is urged by the push portion 6a(6b) of the head plate 1. In this configuration, the extension of the compression spring 11a(11b) terminating at the sub-plate 3 contacts the block member 14a(14b) of the support plate 13a(13b) so that its end never stresses the engage portion 4a(4b). Therefore, any counterforce of the compression spring 11a(11b) is not applied to the head plate 1 via the sub-plate 3.

(2) During Advance of Head Plate

When the head plate 1 advances to its play-mode position, the sub-plate 3 thereon also begins to advance. Accordingly, the projection 5 is moved to the wide portion in the cam 40 of the chassis and permits the sub-plate 3 to pivot right and left. Concurrently, since the change plate 31 has been rotated in a direction corresponding to the selected tape travelling direction, one of the angled side margin of the cam 32 urges the projection 5 to initiate a rotation of the sub-plate 3 in the same direction.

Due to the advance movement of the sub-plate 3 itself and the rotation of the change plate 31, one of the engage portions (4a, for example) of the sub-plate 3 is moved toward the pinch roller 10a and engagingly contacts the end of the compression spring 11a. At that time, since the push portions 6a of the head plate 1 at the advance position does not urge the projection 15a, the support plate 13a is released and allowed to rotate toward the capstan shaft 20a with a compressive force applied thereto from the sub-plate 3 via the compression spring 11a.

Since the advance velocity of the engage portion 4a caused by the advance and rotation of the sub-plate 3 is faster than the advance velocity of the head plate 1, subsequent advance and rotation of the sub-plate 3 causes that the support member 13a pushed by the engage portion 4a advances faster than the head plate 1 to bring its projection 15a into contact with the push portion 6a of the head plate 1 again.

(3) On Completion of Advance of Head Plate (Play Mode)

When the head plate 1 further advances and approaches its play-mode position, the pinch roller 10a abuts the capstan shaft 20a and prohibits a further advance of the support plate 13a. However, the sub-plate 3 further advances, and its engage portion 4a urges the end of the compression spring 11a toward the capstan shaft 20a. Due to this, the extension of the spring 11a is moved away from the block member 14a of the support plate 13a. In this configuration, the counterforce of the compression spring 11a is accepted by the engage portion 4a so that the spring energy urges the pinch roller 10a to the capstan shaft 20a.

The described embodiment, where the counterforce of the spring 11a is never applied to the head plate before the head plate completes its advance movement, is advantageous in reduction of the driving force required for advance movement of the head plate 1.

(4) Opposite Driving Assembly

As to the other assembly including the pinch roller 10b for the opposite driving rotation, since the engage portion 4b of the sub-plate 3 is rotated in the withdrawal direction of the head plate 1, the advance movement of the head plate 1 invites only a small movement of the engage portion 4b. Therefore, the compression force thereof to the compression spring 11b if any is not enough to detach the extension thereof from the block member 14b, and any counterforce of the spring 11b is never applied to the sub-plate nor the head plate.

It should be noted that the invention is never limited to the features in the described embodiment but involves other various arrangements including the following alternatives.

(1) The sub-plate may be divided into two separate parts unique to respective pinch rollers and pivotably mounted at right and left portions on the head plate.

(2) The change plate may be configured to move the sub-plate back and forth by a linear movement thereof in the width direction of the head plate, instead of the pivotal movement thereof in the described embodiment.

(3) Each compression spring may be of a self-restrictive type where its open end does not expand beyond a limited amount when the sub-plate withdraws to a given position, so that the spring does not apply its counterforce to the sub-plate, in absence of the block member of the support plate.

(4) The cam of the chassis may be omitted. In this case, the sub-plate does not return to its neutral angular-position and remains at an angled position before a subsequent operation is effected to move the head plate ahead.

As described, since the invention mechanism is configured to never apply any counterforce of the biasing means to the head plate before the head plate substantially completes its advance movement, the biasing means never produces a resistance during advance movement of the head plate. Therefore, a significantly small energy never fails to bring the head plate to its play position in a short time. This greatly contributes to a dimensional reduction and operational facility of the tape player.

The embodiments of the invention in which an exclusive property or privilege is claimed are defined as follows.

1. A pinch roller compressive mechanism for a tape player, comprising:

a head plate supported on a chassis of the tape player for movement between a first position corresponding to a stop mode of the tape player and a second position corresponding to a play mode of the tape player;

a sub-plate pivotally supported on said head plate and engagable by a change plate which can pivot said sub-plate with respect to said head plate from a first position to a second position which corresponds to a selected tape travelling direction, said sub-plate having an engage portion which moves toward a capstan shaft of the tape player as said sub-plate is pivoted from its first to its second position;

a support part supported on said chassis for pivotal movement about a pivot axis and supporting a pinch roller for rotation about a further axis which is spaced from said pivot axis, said support part being movable between two positions in which said pinch roller is respectively engaging and spaced from said capstan shaft; and pinch roller biasing means cooperable with said support part and said engage portion of said sub-plate for biasing said support part and pinch roller toward said capstan shaft when said sub-plate is in its second position and said head plate is in its second position;

wherein said head plate has thereon an engaging portion which, as said head plate moves to its first position, engages an engage portion on said support part and pivots said support part in a direction causing said pinch roller to move away from said capstan shaft, and which holds said support part in a position in which said pinch roller is spaced from said capstan shaft so long as said head plate remains in its first position.

2. The pinch roller compressive mechanism of claim 1, wherein said tape player is an auto-reverse type and includes a further capstan shaft, a further engage portion on said sub-plate which moves toward and away from said further capstan shaft as said sub-plate respectively moves to and from its first position, a further support part supported on said chassis for pivotal movement about a pivot axis and supporting a further pinch roller for rotation, said further support part being movable between two positions in which said further pinch roller is respectively engaging and spaced from said further capstan shaft, and further pinch roller biasing means cooperable with said further support part and said further engage portion of said sub-plate for biasing said further support part and said pinch roller toward said further capstan shaft when said sub-plate is in its first position and said head plate is in its second position; wherein said first position of said sub-plate corresponds to a further tape travelling direction opposite from said first-mentioned tape travelling direction; wherein when said head plate is in its second position and said sub-plate is in its second position said further support part is free of any biasing force from said further biasing means; and wherein when said head plate is in its second position and said sub-plate is in its first position said first-mentioned support part is free of any biasing force from said first-mentioned biasing means.

3. The pinch roller compressive mechanism of claim 1, wherein said biasing means includes a torsion spring which is supported on said support part and which has an end engageable with said engage portion of said sub-plate.

4. A pinch roller compressive mechanism for a tape player, comprising:

a head plate support on a chassis of the tape player for movement between a first position corresponding to a stop mode of the tape player and second position corresponding to a play mode of the tape player;

a sub-plate pivotally supported on said head plate and engageable by a change plate which can pivot said sub-plate with respect to said head plate from a first position to a second position which corresponds to a tape travelling direction, said sub-plate having an engage portion which moves toward a capstan shaft of the tape player as said sub-plate is pivoted from its first to its second position;

a suppport part supported on said chassis for pivotal movement about a pivot axis and supporting a pinch roller for rotation about a further axis which is spaced from said pivot axis, said support part being movable between two positions in which said pinch roller is respectively engaging and spaced from said capstan shaft; and pinch roller biasing means cooperable with said support part and said engage portion of said sub-plate for biasing said support part and pinch roller toward said capstan shaft when said sub-plate is in its second position and said head plate is in its second position;

wherein a cam is provided on said chassis and can engage a projection provided on said sub-plate, said cam permitting said projection to move so that said sub-plate can pivot between its first and second positions when said head-plate is in its second position, and said cam forcibly moving said projection to a predetermined position when said head plate is in its first position so as to forcibly maintain said sub-plate in a position space from its second position.

5. The pinch roller compressive mechanism of claim 4, wherein said chassis has a wedge-shaped opening therein, and wherein said cam is defined opposite edges of said wedge-shaped opening which diverge with respect to each other in a direction in which said head plate moves from its first position to its second position.

* * * * *

UNITED STATES PATENT AND TRADEMARK OFFICE
CERTIFICATE OF CORRECTION

PATENT NO. : 4 757 403

DATED : July 12, 1988

INVENTOR(S) : Hideki HAYASHI et al

It is certified that error appears in the above-identified patent and that said Letters Patent is hereby corrected as shown below:

Column 6, line 41; after "defined" insert ---by---.

Signed and Sealed this

Twenty-eighth Day of March, 1989

Attest:

DONALD J. QUIGG

Attesting Officer

Commissioner of Patents and Trademarks